(12) United States Patent
Wallerstorfer

(10) Patent No.: US 11,944,923 B2
(45) Date of Patent: Apr. 2, 2024

(54) WATER TANK WITH FILTER CARTRIDGE

(71) Applicant: ACLARIS WATER INNOVATIONS GMBH, LINDAU, ZWEIGNIEDERLASSUNG REBSTEIN, Rebstein (CH)

(72) Inventor: Kurt Wallerstorfer, Strasswalchen (AT)

(73) Assignee: ACLARIS Water Innovations GmbH, Lindau, Zweigniederlassung Rebstein (CH)

(*) Notice: Subject to any disclaimer, the term of this patent is extended or adjusted under 35 U.S.C. 154(b) by 0 days.

(21) Appl. No.: 18/043,845

(22) PCT Filed: Sep. 1, 2021

(86) PCT No.: PCT/EP2021/074161
§ 371 (c)(1),
(2) Date: Mar. 2, 2023

(87) PCT Pub. No.: WO2022/049143
PCT Pub. Date: Mar. 10, 2022

(65) Prior Publication Data
US 2023/0256367 A1 Aug. 17, 2023

(30) Foreign Application Priority Data

Sep. 3, 2020 (DE) ...................... 10 2020 123 004.4
Mar. 22, 2021 (DE) ...................... 10 2021 107 068.6

(51) Int. Cl.
*B01D 35/027* (2006.01)
(52) U.S. Cl.
CPC .. *B01D 35/0276* (2013.01); *B01D 2201/4023* (2013.01); *B01D 2201/4046* (2013.01)

(58) Field of Classification Search
CPC ........ B01D 35/0276; B01D 2201/4023; B01D 2201/4046
(Continued)

(56) References Cited

U.S. PATENT DOCUMENTS 8,864,866 B2  10/2014 Osendorf et al.
2006/0054547 A1  3/2006 Richmond et al.
(Continued)

FOREIGN PATENT DOCUMENTS

CN   110494202 A   11/2019
DE    19717054 C2    7/1999
(Continued)

OTHER PUBLICATIONS

International Search Report and Written Opinion for International Patent Application No. PCT/EP2021/074161, dated Dec. 21, 2021, 15 pages with machine translation in English.
(Continued)

*Primary Examiner* — Madeline Gonzalez
(74) *Attorney, Agent, or Firm* — Christopher J. Volkmann; Kelly, Holt & Christenson, PLLC.

(57) ABSTRACT

A water tank for a household appliance having a connection for a filter cartridge, wherein an annular tank sealing face is provided on the tank bottom for the tight connection of the filter cartridge and the tank sealing face encloses a tank passage opening for the water from the filter cartridge to flow through the wall of the tank bottom to the household appliance, characterized in that the tank sealing face along its circumference has a variable radius in relation to a central axis, so that the tank sealing face comprises radial concavities and/or radial convexities, wherein the convexities and/or concavities have a round profile, and wherein the concavities and/or convexities are configured to periodically oscillate around a circular line.

42 Claims, 15 Drawing Sheets

(58) Field of Classification Search
USPC ....... 210/348, 232, 287, 130, 450, 481, 477, 210/482, 493.2, 172.6, 233
See application file for complete search history.

(56) References Cited

U.S. PATENT DOCUMENTS

| | | | |
|---|---|---|---|
| 2009/0242473 | A1 | 10/2009 | Wallerstorfer et al. |
| 2009/0321342 | A1* | 12/2009 | Wawrla .................. C02F 1/003 210/232 |
| 2010/0025317 | A1 | 2/2010 | Fall et al. |
| 2012/0223006 | A1 | 9/2012 | Sann et al. |
| 2021/0101097 | A1 | 4/2021 | Rathsmann et al. |
| 2023/0242416 | A1 | 8/2023 | Wallerstorfer |
| 2023/0256366 | A1 | 8/2023 | Wallerstorfer |
| 2023/0256368 | A1 | 8/2023 | Wallerstorfer |
| 2023/0271116 | A1 | 8/2023 | Wallerstorfer |

FOREIGN PATENT DOCUMENTS

| | | |
|---|---|---|
| DE | 102004049877 A1 | 4/2006 |
| DE | 102006027267 A1 | 1/2007 |
| DE | 102014223648 A1 | 5/2016 |
| DE | 202017102087 U1 | 7/2018 |
| DE | 112017000784 T5 | 10/2018 |
| EP | 1867606 A1 | 12/2007 |
| EP | 2138078 A1 | 12/2009 |
| EP | 2049218 B1 | 6/2015 |
| EP | 2049220 B1 | 4/2016 |
| EP | 2049221 B1 | 4/2016 |
| EP | 2063972 B1 | 4/2016 |
| EP | 2433906 B1 | 6/2016 |
| RU | 2233607 C2 | 8/2004 |
| RU | 2351271 C2 | 4/2009 |
| RU | 2009108267 A | 9/2010 |
| RU | 2144565 C2 | 2/2011 |
| WO | WO2008017492 A2 | 2/2008 |

OTHER PUBLICATIONS

International Preliminary Report on Patentability for International Patent Application No. PCT/EP2021/074161, dated Oct. 24, 2022, 20 pages.
International Preliminary Report on Patentability for International Patent Application No. PCT/EP2021/074161, dated Oct. 24, 2022, 17 pages with English Translation.
U.S. Appl. No. 18/043,836 Non Final Office Action dated Jul. 18, 2023, 13 pages.
U.S. Appl. No. 18/043,844 Non Final Office Action dated Jun. 23, 2023, 13 pages.
U.S. Appl. No. 18/043,849 Non Final Office Action dated Jun. 22, 2023, 15 pages.
International Search Report for Russian Application No. PCT/EP2021/074140 dated Jul. 20, 2023, 2 pages.
International Search Report for Russian Application No. PCT/EP2021/074161 dated Jul. 20, 2023, 2 pages.
International Search Report for Russian Application No. PCT/EP2021/074148 dated Aug. 21, 2023, 2 pages.
First Office Action in Chinese Applicaton No. 202180073063.8, dated Oct. 26, 2023. 11 pages.
First Office Action for German Patent Application No. 102021122626.0, dated Jan. 23, 2024. 7 pages.

* cited by examiner

WATER TANK WITH FILTER CARTRIDGE

CROSS-REFERENCES TO RELATED APPLICATIONS

This Application is a Section 371 National Stage Application of International Application No. PCT/EP2021/074161, filed Sep. 1, 2021, and published as WO 2022/049143A1 on Mar. 10, 2022, and claims priority to German Application Nos. 10 2021 107 068.6, filed Mar. 22, 2021 and 10 2020 123 004.4 filed Sep. 3, 2020, the contents of each are hereby incorporated by reference in their entirety.

DETAILED DESCRIPTION

Figure 1:
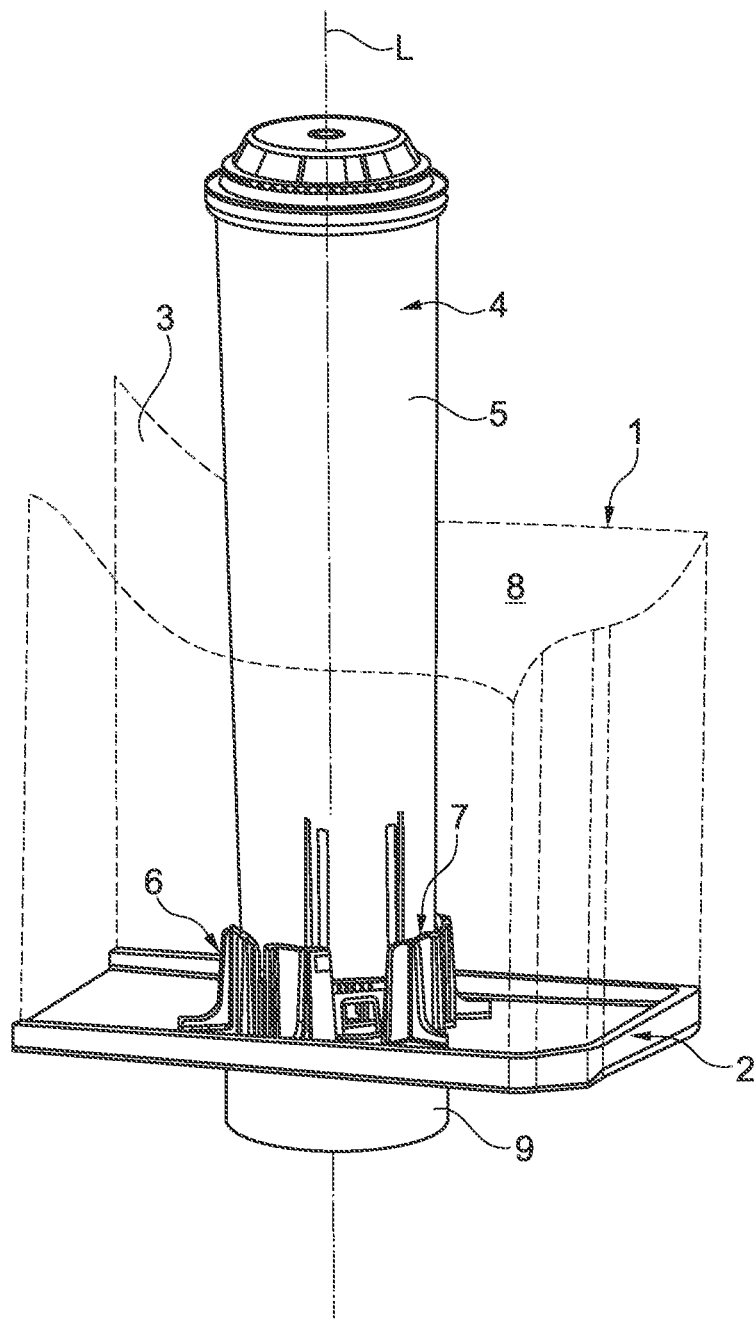
FIG. 1 shows a perspective illustration of a tank bottom with an inserted filter cartridge according to the prior art.

The present disclosure relates to a water tank with a filter cartridge according to the preamble of claim 1.

Filter cartridges are typically used in water-carrying household appliances with a water tank, in particular in beverage machines such as coffee machines, tea machines, etc., in order to improve the water quality in accordance with the intended application. Filter media for water softening, such as ion exchange resin, or to improve the taste, such as activated carbon, are often used in such filter cartridges. The metered addition of additives, e.g. for health or taste improvement, such as the addition of minerals or vitamins, etc., is already provided for in combination with filter media.

Water tanks of machines of this type according to the prior art typically have tank connection elements on the tank bottom with an annular tank sealing face for the tight connection of a filter connection element of the filter cartridge provided for such a water tank, which enclose a tank passage opening in the tank bottom for the water to flow from the filter cartridge and the water tank to the household appliance.

Such water tanks and filter cartridges are described, for example, in publications DE 10 2004 050 877 A1, EP 1 867 626 A1 and DE 197 17 056 C2.

To prevent unsuitable filter cartridges from being used, the tank connection elements have already been provided with coding elements so that only filter cartridges that match these coding elements can be used.

Document US 2010/0025317 A1 discloses an in-line filter having an inlet line and an outlet line which are connected to a housing. Located in the housing is a filter cartridge, the filter medium of which is arranged in a cylindrical shape. At the outlet of the housing there is a seat with coding structures, while at the outlet of the cartridge there is a matching end cap.

Document EP 2 138 078 A1 discloses a connection device for permanently connecting to a tank bottom, which has pocket-shaped connection elements for connecting to the tank bottom. These are connected with tank-proximal fixing means in such a way that they can no longer be released in a non-destructive manner from the tank. A filter cartridge is then to be inserted into this connection device in a replaceable manner, wherein the connection device and the filter cartridge have hexagonal coding structures.

In certain embodiments, which are disclosed for example in publications WO 2008/017492 A2, EP 2 433 906 B1, EP 2 065 972 B1, EP 2 050 220 B1, EP 2 050 221 B1 and EP 2 050 218 B1, the filter sealing faces and the tank sealing faces have a polygonal shape provided for coding, so that apart from the sealing function an additional coding function is also performed by the seal itself.

These embodiments have the disadvantage that the angular contour makes it more difficult to implement the sealing function in comparison to a round contour.

An object of one example is therefore to refine such a water tank and such a filter cartridge in such a manner that the coding function mentioned is made possible without such disadvantages.

Proceeding from a water tank and a filter cartridge according to the preamble of claim 1, this object is achieved by the characterizing features thereof.

In the following, elements to be assigned to the water tank are generally provided with the assigning word beginning "tank" and elements to be assigned to the filter cartridge are provided with the assigning word beginning "filter". Features of advantageous embodiments and refinements of the present disclosure are described below in such a way that they are not mandatory, but may be present.

The filter cartridge of a water tank according to one example is provided with a filter housing, the wall of which separates a housing internal side from a housing external side, wherein an open filter inlet opening is provided for water to enter from the water supply without any further connection elements, which, accordingly when used in a water tank, in the operating position of the filter cartridge is connected to the tank interior. Downstream of the filter inlet opening relative to the direction of flow during operation, a device for water conduction is provided in the interior of the filter housing, which comprises at least one filter chamber having at least one filter medium and terminates in a filter outlet opening for suctioning water from the filter cartridge. A filter connection element is provided with an annular filter port, which has an annular filter sealing face for the tight connection of the filter cartridge to a tank sealing face in the water tank.

As a result of this design embodiment, such a filter cartridge differs from filter cartridges of filter devices whose housings are connected tightly to water pipes of a water network with pressure-resistant connections and are thus integrated into the water network.

A filter cartridge according to the present disclosure has a filter sealing face, the profile of which along the circumference of the annular filter port has a variable radius in relation to a central axis, so that the filter sealing face comprises radial convexities and/or radial concavities, wherein the convexities and/or concavities have a round profile, so that corners or edges are avoided.

As a result, there are further possibilities for coding. This shape of the filter sealing face matches a corresponding shape of a tank sealing face, with the curvatures changing from the external side to the internal side and vice versa over the profile of the circumference making it more difficult or completely impossible to clamp or press a shaped seal that is not adapted in shape onto or into a fixed tank-proximal contact surface. The radial convexities and/or concavities mimic the shape of an annular spring, the circumference of which can be resiliently expanded or compressed. The spring effect also improves the sealing effect, since the filter sealing face is pressed flat against the associated tank sealing face by the spring pressure. The filter sealing face and the tank sealing face can also be used to fix the filter cartridge and then form a filter fixing face or a tank fixing face. This fixing function in the interaction of the filter sealing face and the tank sealing face is improved by such a spring effect.

The resilient deformability of the filter sealing face can be improved in that the annular filter port of the filter connection element having the filter sealing face in the region of the filter sealing face has an annular wall having a wall internal side and a wall external side that run parallel or inclined to one another. Depending on whether the connector is pushed onto a tank fixing face or plugged into a tank sealing face, either the wall external side or the wall internal side of the annular wall comprises or forms the filter sealing face.

Since in this embodiment the side of the wall opposite the filter sealing face has the same shape having a correspondingly larger or smaller circumference, this wall is configured overall as an annular spring. The annular wall then forms an annular spring with parallel or mutually inclined circumferential sides.

The annular filter port of the filter connection element, which has the filter sealing face, at least in the region of the filter sealing face, can consist of a plastic that is more dimensionally stable at the operating temperature than an elastomer. Due to this strength, the filter port of the filter cartridge is able to exert a contact pressure on a tank-proximal tank sealing face in order to establish the tight connection without impairing its shape.

Such a dimensionally stable plastic is stronger than an elastomer, so that an elastomer seal on the water tank side can be deformed by the filter port. A contact pressure can be generated as a result. Deformation of an elastomer seal can also cause one or more additional functions of the elastomer seal, for example a mechanical or hydraulic function such as a fixing function, a valve function or the like.

This is advantageous, for example, when the filter sealing face forms an external face of the annular filter port of the filter connection element that points away from a central axis of the filter outlet opening. Such a filter port, despite the changing circumferential curvatures, is able to exert a contact pressure outward essentially over the entire circumference when it is inserted into a water tank-proximal water tank seal with a correspondingly radially inward-facing tank sealing face in order to achieve the desired sealing effect and/or fixing effect.

In a further refinement of the present disclosure the arrangement of the convexities and concavities of the filter sealing face is configured so as to be rotationally symmetrical over the circumference. This results in a restoring force of the annular spring that is evenly distributed over the circumference with more stable fixing and sealing of the filter cartridge in the installed position. A rotationally symmetrical configuration of the filter sealing face over the circumference results when the convexities and/or concavities are configured to periodically oscillate around a circular line. This allows for different angular positions of the filter cartridge, making it easier to connect the latter. In addition, other technical functions can also be provided depending on the angle.

More stable fixing of the filter cartridge in the installation position is achieved in that the arrangement of the convexities and concavities of the tank sealing face and/or the filter sealing face is configured with the same angles over the circumference. The annular spring formed in this way can thus deform uniformly over the circumference both in the region of the convexities and in the region of the concavities.

The sealing effect of the filter sealing face having the tank sealing face is improved by a round profile of the convexities and/or concavities, so that corners or edges are avoided. Due to the round profile, avoiding corners or edges in the region of the sealing faces, the sealing function is improved, for example compared to polygonal shapes as in the prior art. An improvement in the mechanical clamping and thus the fixing is also possible due to the variable radius, for example also compared to a circular shape.

The convexities and concavities of the filter fixing face can form a wave shape along a circular line, the wave shape consisting of an alternating sequence of convex circle segments forming the convexities and concave circle segments forming the concavities. A radially directed spring effect results from the profile following a circular line.

The spring action of the annular spring can be further improved if the concave and convex circle segments are connected tangentially at turning points at the transition between concave and convex curvatures.

In a specific embodiment of the present disclosure, the arc length of the convex circle segments is longer than the arc length of the concave circle segments. The swept angle of the convex circle segments is therefore greater than the swept angle of the concave circle segments. As a result, the tangential transition between the curves runs obliquely in relation to a central circle of the annular spring, so that no radially inward- or outward-directed force arises in the transitions during the deformation.

In a specific embodiment, the convex and the concave circle segments have the same segment radius. This results in a comparable force distribution within the segments during deformation.

The circle segments can be disposed in such a way that the convex and the concave circle segments lie within an outer envelope circle and outside an inner envelope circle, with the circle centers of the convex circle segments lying within the inner envelope circle and the circle centers of the concave circle centers lying outside the outer envelope circle. This shape results in a flat profile in relation to the envelope circles or circle segments running along a center line between the envelope circles, as a result of which the widening or shrinking of the annular spring is facilitated.

A good function has been shown when the radius of the inner envelope circle is between 5% and 15% of the radius of the outer envelope circle.

Furthermore, it has proven to be advantageous if the radius of the convex and/or concave circle segments is between 20% and 35% of the radius of the outer envelope circle.

The spring effect of such a spring ring is further counteracted when the wall thickness between the external side of the wall and the internal side of the wall running parallel or inclined thereto is between 7% and 10% of the radius of the outer envelope circle.

In addition, a profile has been shown to be advantageous when the turning points between the curvatures of the concave and convex circle segments are closer to the inner envelope circle than to the outer envelope circle.

The filter sealing face can form an external face of the annular filter port of the filter connection element that points away from a central axis of the filter outlet opening. Such a filter port, despite the changing circumferential curvatures, is able to exert a resilient contact pressure outwards essentially over the entire circumference when it is inserted into an opening on the water tank with a correspondingly radially inward-facing tank fixing face in order to achieve the desired sealing and/or fixing effect. Conversely, when plugged onto a tank connector on the water tank with a correspondingly radially outward-pointing tank sealing face, a resilient contact pressure can be exerted inwards essentially over the entire circumference by a radially inward-pointing filter sealing face, in order to achieve the desired sealing and/or fixing effect.

In a particular embodiment of the present disclosure , a filter fixing face is provided both on the internal side and on the external side of the filter port, one or both of which simultaneously form a filter sealing face. Such a filter port can be inserted into an annular slot on the tank, the side walls of which each form a tank fixing face and/or a tank sealing face.

A constellation that works very well has been found, for example, when six convexities and six concavities are provided along a circular line that has a diameter of less than 3 cm.

The filter inlet opening of the filter cartridge can be configured as an annular screen opening on the outside of the filter port, as a result of which the filter cartridge in the water tank is open to the water contained therein.

The filter cartridge is improved if a guide structure for guiding and receiving a water tank-proximal centering element is provided within the filter port. The filter cartridge can thus be aligned in the axial direction when it is inserted into the associated water tank and fixed in this alignment in the operating position.

If the guide structure has at least one guide groove running in the axial direction, i.e. parallel to the central axis, for accommodating at least one guide rib of the centering element on the water tank, the filter cartridge when it is inserted into the water tank, by way of this guide structure and in interaction with the associated water tank-proximal centering element, can be guided into at least one angular position and additionally fixed there by the axial movement.

In order to provide guiding and fixing in a number of angular positions, the guide structure can have a number of guide grooves distributed around the circumference for this purpose.

Good guiding of the filter cartridge into the desired angular position is obtained when the wall of the guide grooves is radiused in such a manner that the width of the grooves tapers from bottom to top in relation to the operating position. The guiding of the filter cartridge can also be improved if the walls of the guide grooves are radiused in such a manner that the width of the grooves tapers radially from the internal side to the outside. The combination of the two tapering groove shapes results in a type of funnel effect for a rib of a water tank-proximal centering element that enters such a groove.

The groove shapes mentioned can be configured, for example, by means of internal curvatures in a wall of the guide structure connecting the guide grooves.

The shape of the filter sealing face according to one example can also be used to improve the fixing of the filter cartridge, in that the filter sealing face is simultaneously provided as a filter fixing face. The shape of the filter sealing face according to one example, provided as a filter fixing face, facilitates deformation of the filter port in the region of the filter fixing face, since the radial convexities and/or concavities form the shape of an annular spring, the circumference of which can be expanded or compressed in a resilient manner Such a deformation facilitated by the variable radius makes it possible to improve the mechanical clamping and thus the fixing, for example in comparison to a circular shape or a polygonal shape.

The resilient deformability of the filter fixing face can be improved in that the annular filter port of the filter connection element that has the filter fixing face has a annular wall in the region of the filter fixing face with a wall internal side and a wall external side that run parallel or inclined to one another. Depending on whether the connector is pushed onto a tank fixing face or plugged into a tank fixing face, either the internal face or the external face of the annular wall comprises or forms the filter fixing face.

Since in this embodiment the side of the wall opposite the filter fixing face has the same shape with a correspondingly larger or smaller circumference, this wall is configured overall as an annular spring. The annular wall then forms an annular spring with parallel or mutually inclined circumferential sides.

Furthermore, the annular filter port of the filter connection element can have an external and/or internal wall which is beveled in relation to the vertical, so that the external wall and the internal wall converge from top to bottom relative to the operating position of the filter cartridge. This results in a guiding aid that facilitates the insertion of the connector into a gap between two suitably shaped tank-proximal surfaces, with the tank-proximal surfaces being able to at least partially form an inner and/or outer tank sealing face.

Accordingly, the beveled external wall can have an outer filter sealing face and/or the beveled internal wall can have an inner filter sealing face in order to establish a sealing form-fit with the corresponding tank sealing face.

The water tank corresponding to the above-mentioned filter cartridge for a domestic appliance has a tank bottom, wherein an annular tank sealing face is provided on the tank bottom for the tight connection of the filter cartridge, which encloses a tank passage opening for the water to flow out of the filter cartridge through the wall of the tank bottom to the domestic appliance. For an advantageous interaction with the filter sealing face described above, the profile of the tank sealing face also has a variable radius along its circumference in relation to a central axis, so that the tank sealing face comprises radial concavities and/or radial convexities.

This results in the coding options shown above for the filter cartridge on the water tank. Due to this shape of the tank sealing face, a filter cartridge with a corresponding filter sealing face can be used in the water tank as described above. For the adaptation of the filter cartridge and tank-proximal connection, the selection of the materials and their arrangement can thus also be decisive and thus part of the coding due to this shape. In the process, corners or edges in the region of the sealing faces can be avoided, as a result of which the sealing function is improved, for example, compared to polygon shapes from the prior art. An improvement in the mechanical clamping and thus the fixing is also possible due to the variable radius, for example compared to a circular shape.

The tank sealing face is configured so as to match the above-mentioned filter sealing face in such a way that the annular tank sealing face forms an internal face of a tank connection element that points toward the central axis of the tank passage opening. Such a tank sealing face matches the shape of the filter-proximal filter port, so that it can be inserted into the tank connection element. Despite the changing circumferential curvatures when the filter port is inserted into the tank connection element with the tank sealing face pointing radially inwards, the desired sealing effect can thus be achieved essentially over the entire circumference.

For the use of a filter cartridge in which the concavities and/or convexities of the filter sealing face are configured to periodically oscillate around a circular line, as mentioned above, the concavities and/or convexities of the tank sealing face are also configured to periodically oscillate around a circular line to match the filter sealing face. Likewise, the concavities and/or convexities of the tank sealing face can have a round profile for adaptation to a correspondingly shaped filter sealing face.

For adapting to a correspondingly shaped filter sealing face, six concavities and six convexities along a circular line with a diameter of less than 3 cm can also be provided on the tank sealing face.

With the individual adaptations of the tank sealing face to a correspondingly shaped filter sealing face, the respective advantages that are mentioned above with regard to the filter cartridge can also be achieved.

The annular tank connection element can comprise an annular elastomer seal in which the radial convexities and/or radial concavities are preformed. Such a tank connection element is particularly advantageous in connection with a filter cartridge whose annular filter port consists of a plastics material that is dimensionally stable at the operating temperature in the region of the filter sealing face. The elastomer seal yields to the dimensionally stable plastics material on the filter cartridge when the filter cartridge is inserted.

The elastomer seal preferably has the tank sealing face that seals against the filter cartridge on the internal side of the radial convexities and/or radial concavities.

Furthermore, it is advantageous if the tank sealing face of the elastomer seal has an oblique profile leading from top to bottom toward the central axis. As a result of this profile, the elastomer seal is increasingly elastically deformed outward during the process of inserting the filter cartridge, and the resultant restoring force creates a contact pressure that ensures the desired sealing effect.

By deforming an elastomer seal, one or more other functions can also be brought about in addition to the fixing function and the sealing function. This can, for example, also be a hydraulic function such as a valve function or the like.

For the use of an elastomer seal, it is advantageous if the tank bottom comprises a fastening ring and an elastomer seal inserted into the fastening ring. The external fastening ring then prevents the elastomer seal from expanding, so that the elastic restoring force of the elastomer is almost completely available for generating the contact pressure.

In order to avoid a flow between the fastening ring and the elastomer seal, the elastomer seal can have a sealing face for the tight closure of the elastomer seal in relation to the fastening ring. Furthermore, the elastomer seal can have a sealing face for the tight closure of the fastening ring in relation to the tank bottom.

Advantageously, a bypass channel for unfiltered can also be provided in the tank bottom, which runs out of the water tank interior through the fastening ring and through the elastomer seal. This allows drainage from the water tank if no filter cartridge is inserted. Such drainage may be needed when no filter cartridge is at hand or when operation without a filter cartridge is required, e.g. in a maintenance operation such as cleaning or descaling the associated machine. The cleaning or descaling agents used in such cases should not make their way into a filter cartridge.

The bypass channel can, for example, comprise an annular gap in the elastomer seal, so that a flow of water which is distributed over the circumference runs into the outlet line.

The elastomer seal preferably includes a closure element, by means of which the bypass channel can be closed, in particular by inserting the filter cartridge into the elastomer seal. As a result, the bypass can be closed without further measures when using a suitable filter cartridge.

The elastomer seal can be shaped, for example, in such a way that the closure element comprises two opposite annular sealing faces in the annular gap, by way of which the annular gap can be closed when the elastomer seal is deformed. If the inner sealing face of the two annular sealing faces is widened when a filter cartridge is inserted into the elastomer seal, then a form-fit with the outer annular sealing face is to be effected, with the bypass channel being closed.

For easy attachment of the attachment ring and/or the elastomer seal to the tank bottom, the attachment ring can comprise a latching element for latching to the tank bottom.

Furthermore, a centering element for insertion into the filter cartridge can be provided on the tank bottom. When inserting a filter cartridge, guiding into the correct operating position can take place by means of such a centering element. In addition, the shape of the centering element can also be used for further coding in order to ensure that only suitable filter cartridges are used. In addition, a fixing function can also be exercised with such a centering element, for example against twisting or tilting of the filter cartridge. The unintentional loosening of the filter cartridge can also be prevented by appropriate friction surfaces, so that a corresponding frictional force has to be overcome when the filter cartridge is removed. Additional fixing elements can also be attached to the centering element.

To connect the centering element to the elastomer seal, the centering element can have a bottom plate that lies in a receptacle in the elastomer seal and engages behind it at the periphery. The centering element is thus attached to the tank bottom by the elastomer seal.

If a bypass of unfiltered water is provided, the centering element can have a bypass opening, for example in the bottom plate, which is open to the central drain.

The centering element preferably comprises a centering mandrel which protrudes upward from the bottom plate of the centering element and has an annular external face which has a variable radius in relation to the central axis, so that the external face comprises radial concavities and/or radial convexities. Such a centering mandrel is adapted to the external contour of the elastomer seal and of the filter port of the associated filter cartridge.

In one embodiment, the concavities and/or convexities of the external face of the centering mandrel are configured to periodically oscillate around a circular line. This configuration corresponds to the shape of a corresponding elastomer seal and thus only leaves an annular gap with the concavities and/or convexities free for inserting a suitable filter cartridge. This configuration therefore prevents the use of a connection geometry of a different shape within the elastomer seal and thus improves the coding. In addition, the filter port can be supported on the internal side of the filter port along its convexities and/or concavities in order to reliably deform the elastomer seal on the opposite external side when the filter cartridge is inserted.

The concavities and/or convexities of the external face of the centering mandrel can have a round profile to adapt to the shape of the elastomer seal and/or of the filter port.

With a corresponding profile of the elastomer seal and/or of the filter port, six concavities and six concavities along a circular line with a diameter of less than 3 cm are provided on the external face of the centering mandrel for adapting the latter.

In an advantageous embodiment, above the external face having the concavities and/or convexities, there is a step and an inwardly offset projection which is inserted further into the filter cartridge and thus offers a greater axial guiding length.

In order to prevent axial sealing on this step by an unsuitable filter cartridge, at least one tooth projecting upward in the extension of the peripheral surface can be disposed above the annular external face.

At least one passage opening leading to the tank passage opening can be provided in the centering element above the annular external face, which passage opening connects the water inlet into the filter cartridge with the water outlet and is only closed by a filter cartridge sealing according to one example.

The axial guiding and centering can be improved in that at least one guide rib is provided in the centering element above the annular wall. A water flow is possible next to this guide rib or, in the case of several guide ribs, between them. These guide ribs can be guided when attaching a filter cartridge in the guide grooves mentioned above.

A further guiding aid for the centered insertion of the filter cartridge results from the fact that the guide rib or guide ribs are beveled at the top toward the central axis. When being plugged in, the filter port can slide along these bevels until it reaches the centered position.

The elastomer seal can also have a sealing face for the tight closure of the fastening ring with respect to the tank bottom in order to ensure that no unwanted water from the water tank flows past the filter cartridge via the fastening ring.

The fastening ring can also include a latching element for latching the fastening ring to the insert or to the tank bottom. This facilitates the assembly of the fastening ring. If the centering element is also held by the fastening ring, as mentioned above, its assembly and possibly also the assembly of the water tank valve located underneath is simplified.

The design of the water tank is simplified when an insert which is assigned to the tank bottom and comprises the parts provided on the water tank for connecting the filter cartridge is provided on the tank bottom. With one insert, different connector structures can be easily manufactured in the same water tank design by using different inserts. In addition, different requirements for the manufacturing tolerance of the water tank and the respective insert can be selected.

Such an insert can advantageously be the elastomer seal and/or the fastening ring and/or the centering element and/or at least partially the bypass channel All the essential tank connector structures can be provided on the insert, so that the water tank can only be adapted to a specific filter cartridge by selecting the appropriate insert.

An embodiment of the present disclosure is shown in the drawing and is explained in more detail with reference to the following figures.

FIG. 1 visualizes the usual configuration of a water tank 1 of a beverage machine, such as a coffee machine, for example a fully automatic coffee machine according to the prior art. The water tank 1 comprises a tank bottom 2 and water tank side walls 3, partially shown with dashed lines. A filter cartridge 4 with a filter housing 5 is inserted into the water tank 1. The connection between the tank bottom 2 and the filter cartridge 4 is realized via tank connection elements 6 on the water tank and filter connection elements 7 on the filter.

The filter cartridge 4 is located in the interior 8 of the water tank 1, i.e. during operation, it stands entirely or partially in the water stored in the water tank 1. A filter port 9 of the water tank 1 for connecting the water tank 1 to the beverage machine (not shown) protrudes from the lower side of the water tank 1.

Figure 2:
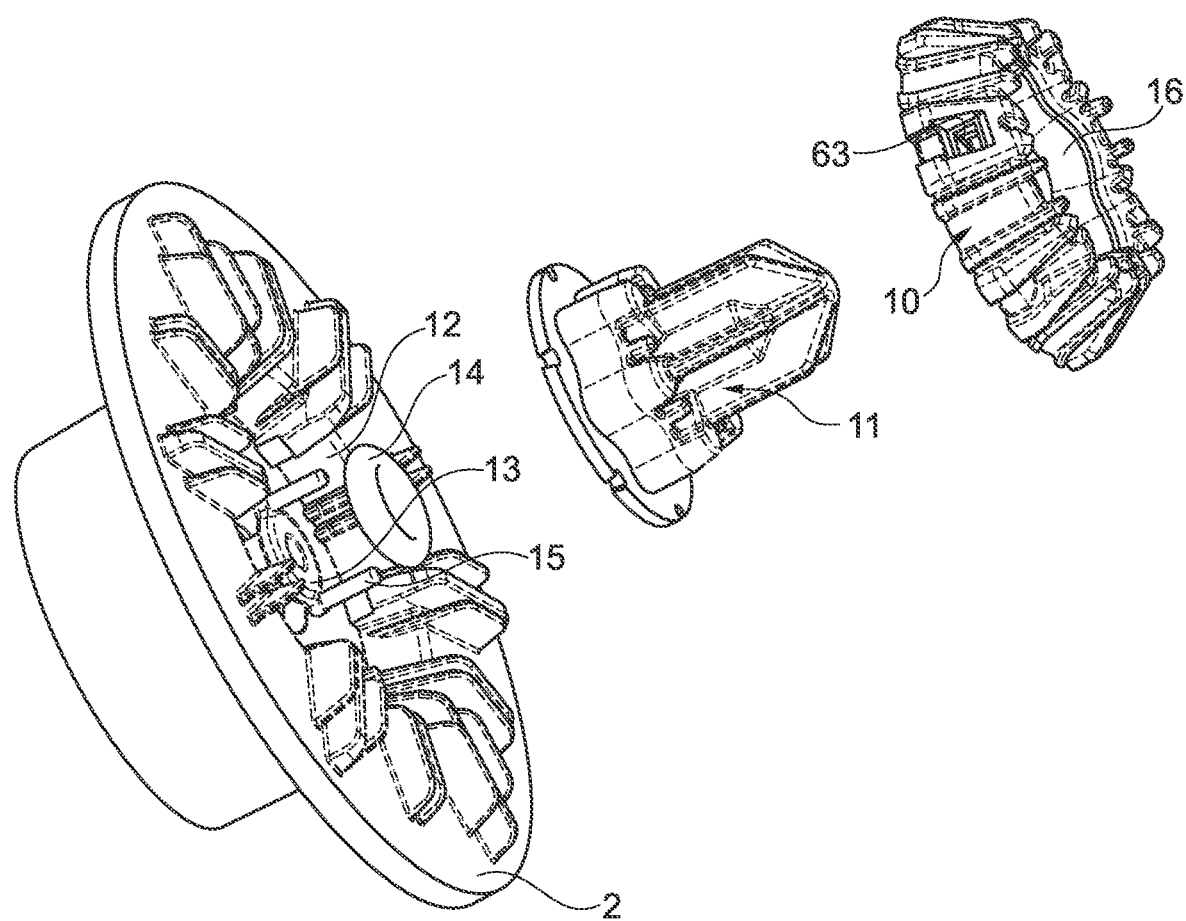
FIG. 2 shows a perspective exploded illustration of a tank bottom with a centering element and a fastening ring, in accordance with one example.

Illustrated in FIG. 2 is a round fragment of the tank bottom 2, wherein provided are a fastening ring 10 and a centering element 11 for insertion into a recess 12 in the tank bottom 2. A tank valve body 13 with a seal 14 configured as an O-ring, from which two pins 15 protrude upwards, can likewise be seen in FIG. 2. The fastening ring 10 also carries an elastomer seal 16.

Figure 3:
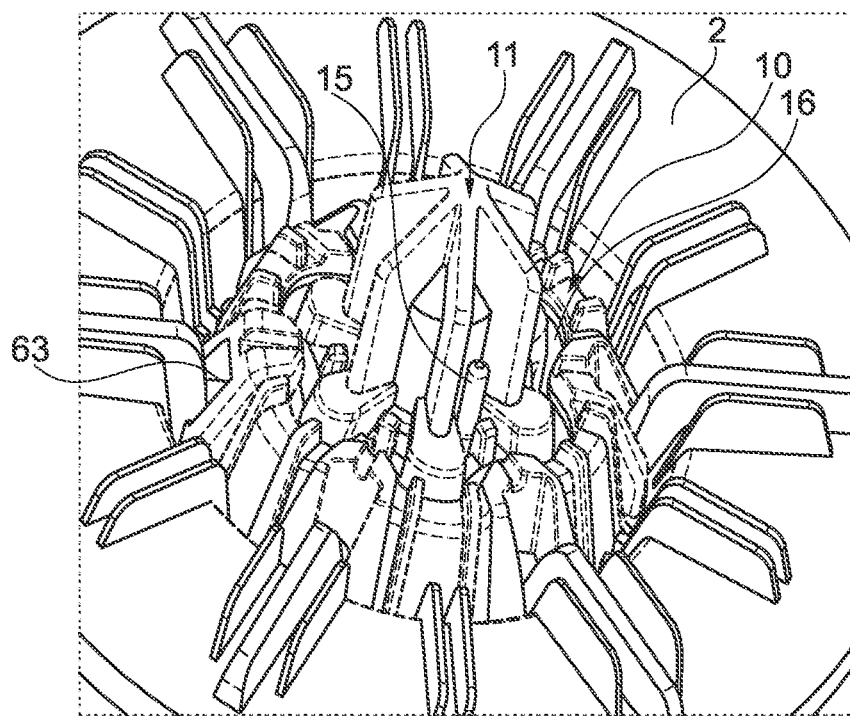
FIG. 3 shows a perspective illustration of the tank bottom according to FIG. 2 with an installed centering element and an installed fastening ring.
Figure 4:
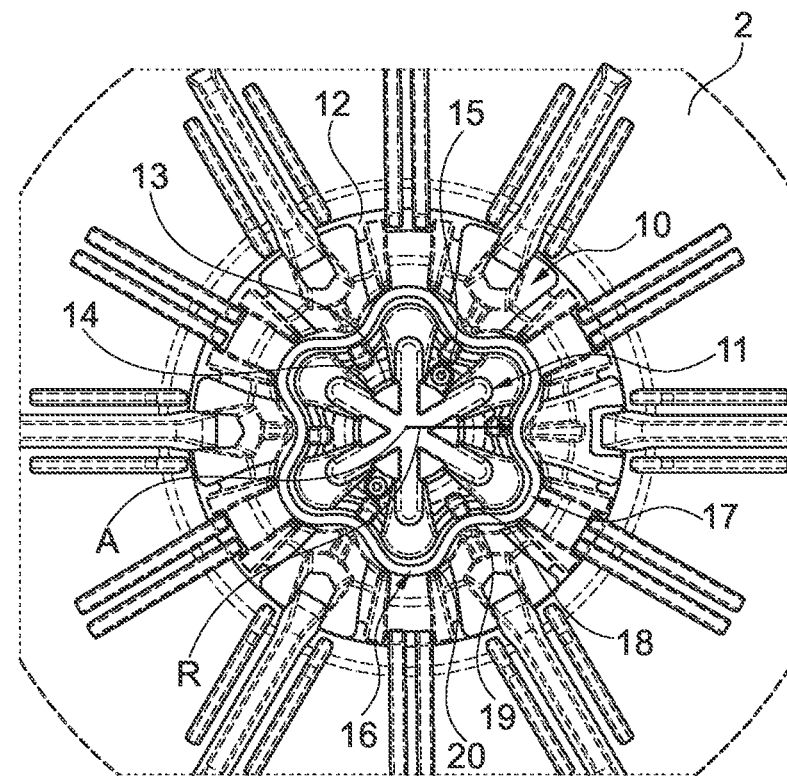
FIG. 4 shows a top view of the tank bottom according to FIGS. 2 and 3.

In FIGS. 3 and 4, the fastening ring 10 and the centering element 11 are installed in the tank bottom 2. It can be seen here that the pins 15 can pass through the centering element and thus form coding elements for coding the water tank in relation to the associated machine connection, by which the tank valve body 13 must be actuated when the water tank is inserted. It is also clearly visible in FIG. 4 that the elastomer seal 16 forming the water tank seal 17 is an annular seal which has a variable radius R along its circumference in relation to a central axis A, so that the internal face of the water tank seal 17 that forms a tank sealing face 18 comprises radial concavities 19 and radial convexities 20. The first tank sealing face 18 simultaneously serves as the first tank fixing face.

Figure 5:
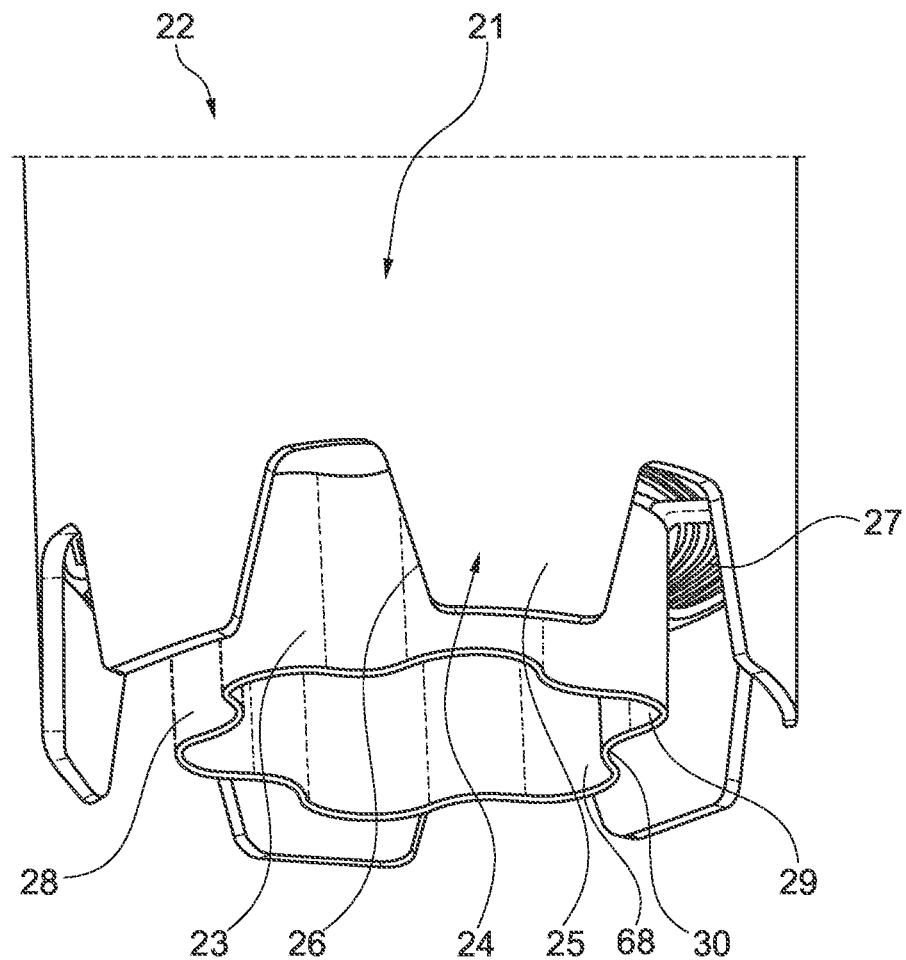
FIG. 5 shows a perspective illustration of the connection region of the filter cartridge viewed from the side, in one example.

In FIG. 5 the connection region 21 of a suitable filter cartridge 22 is shown. A filter port 23 forms an inner ring surrounded by an outer ring 24 with axially extending projections 25 and recesses 26. Between the inner ring 23 and the outer ring 24 is an annular inlet screen 27 through which water enters the filter cartridge. The external face 28 and the internal face 68 of the filter port 23 are also provided with convexities 29 and concavities 30 to match the tank sealing face 18. The external face 28 and/or the internal face 68 of the filter port 23 can simultaneously serve as a filter fixing face.

Figure 6:
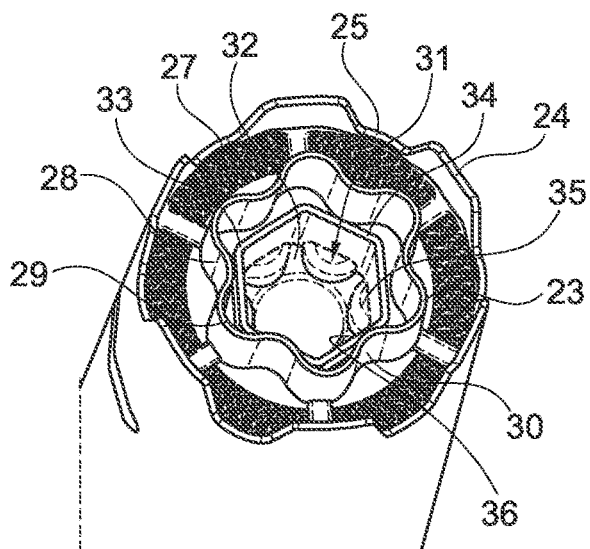
FIG. 6 shows a perspective illustration of the connection region of the filter cartridge viewed obliquely from below, in one example.
Figure 7:
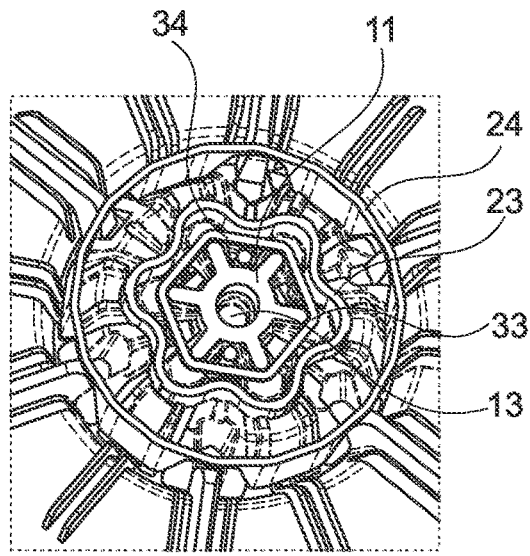
FIG. 7 shows a perspective illustration of a filter cartridge cut open at the level of the filter port, inserted into a tank bottom, in one example.

In the view of FIG. 6, in addition to the parts of the connection region 21 of the filter cartridge 22 described above, the special configuration of a guide structure 31 of the filter cartridge 22 for receiving the centering element 11 is shown. The guide structure has guide grooves 32 which are aligned with the edges 33 of a polygonal ring 34, in the present example with six guide grooves which are aligned with six edges of a hexagonal ring. In the sectional illustration with a view from above according to FIG. 7, the sectional plane goes through this polygonal ring 34.

Figure 8:
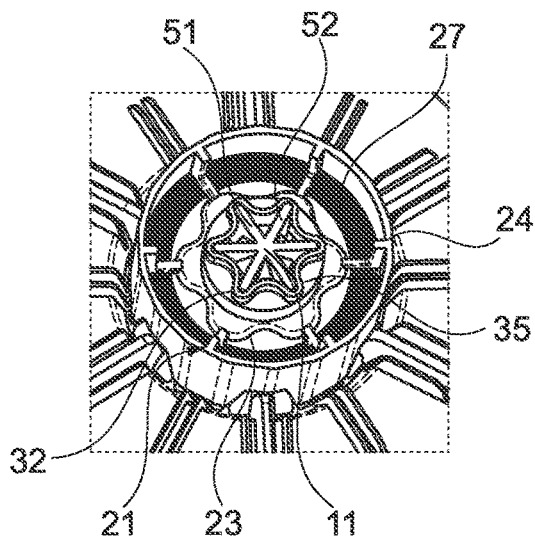
FIG. 8 shows a perspective illustration of a filter cartridge cut open at the level of the guide grooves, inserted into a tank bottom, in one example.

Inner curvatures 35 which lie between the edges 33 and the guide grooves 32 adjoin upward into the interior of the filter cartridge. The inner curvatures 35 form the side walls 36 of the guide grooves 32. Due to this arched shape, the walls 36 of the guide grooves 32 taper both in the axial direction upward (relative to the operating position) and in the radial direction from the inside to the outside. In the intersection point, when viewed from above according to FIG. 8, the section plane runs at a height at which the guide grooves 32 are clearly configured. A riser pipe 37 is connected centrally on the internal side, through which the water entering the filter cartridge 22 is directed upward to the filter section.

Figure 9:
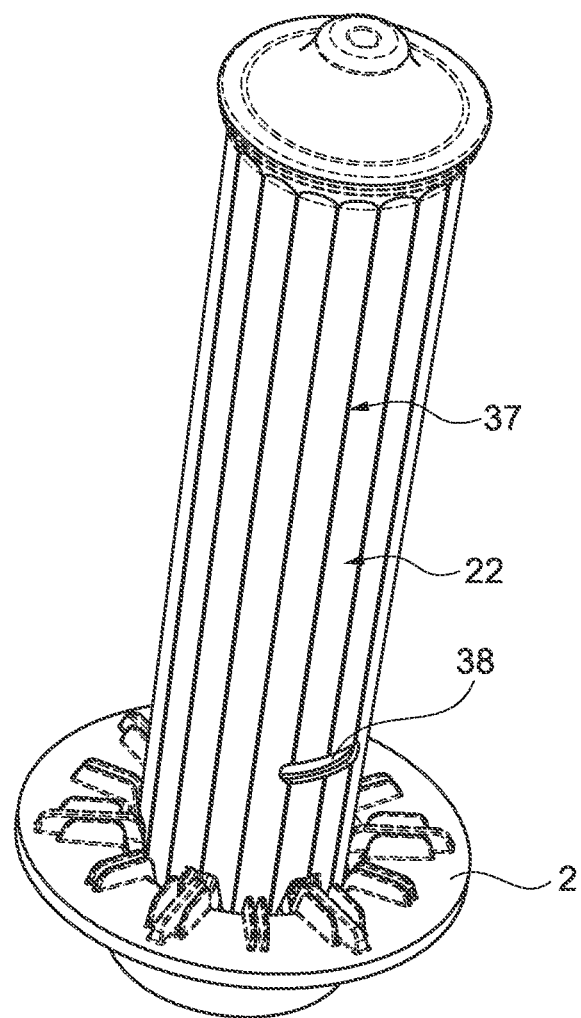
FIG. 9 shows a perspective illustration of a filter cartridge inserted into a tank bottom, in one example

In FIG. 9 the entire filter cartridge 22 is shown. In a filter housing 37, which has an optional lateral metering opening 38 and the water connection on the bottom described. The optional metering opening 38 is only provided in the case of an embodiment of the filter cartridge that is configured for dispensing additives, e.g. minerals, vitamins or the like, from a metering chamber accommodated in the filter housing 37 into the water reservoir. Since such a metering chamber is closed within the filter housing 37 with respect to the filter section, it has no further significance with regard to the filtration. A filter cartridge according to one example can therefore also be readily constructed without this metering chamber and its metering opening 38. In particular, the operating position can be seen in FIG. 9, to which the statements above and below in this description relate.

Figure 10:
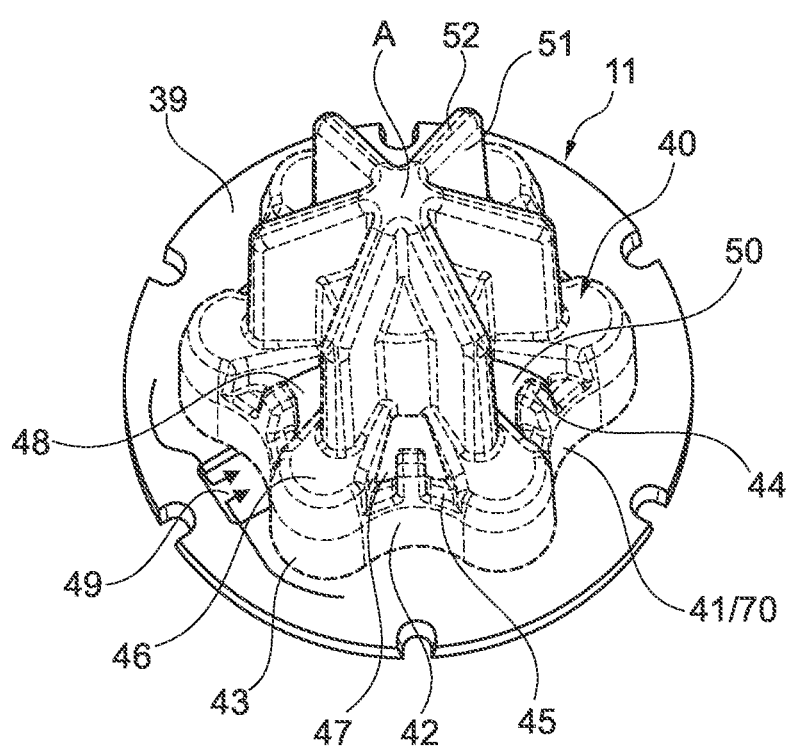
FIG. 10 shows a perspective illustration of the centering element, in one example.

A perspective illustration of the centering element 11 can be seen in FIG. 10. The centering element is provided with a bottom plate 39 which, in the installed state, lies in a receptacle of the elastomer seal and peripherally engages said receptacle from behind. A centering mandrel 40 protrudes upward from the bottom plate 39 and has an annular external face 41 which also forms a second tank fixing face. This external face 41 has a radius that varies along the circumference in relation to the central axis A, so that this external face 41 also comprises radial concavities 42 and convexities 43. The external face 41 is thus adapted to a corresponding shape of the filter port 9.

For further adaptation, the concavities 42 and convexities 43 of this external face 41 are also configured to periodically oscillate around a circular line, and have a round profile. In the illustrated embodiment, six concavities 42 and six convexities 43 are provided along a circular line with a diameter of less than 3 cm, corresponding to the design of the illustrated embodiment of the filter cartridge 22. With a different filter cartridge, the adaptation of the external face 41 or the second tank fixing face must be modified accordingly.

All adaptations to the external face 41 of the centering mandrel 11 result in only an annular slot between the external face 41 and the elastomer seal 16 for inserting the filter port 23 being open in the installed state. This results in a further coding against the use of an unsuitable filter cartridge. In addition, in this way it is possible to support the filter port 23 on its internal side on the external face 41 of the centering mandrel 11. In this way, the contact pressure of the filter port on the elastomer seal 16 can be increased uniformly over the variable shape along the entire peripheral shape.

At least one upwardly projecting tooth 44 is provided above the annular external face. The one tooth or the plurality of teeth 44 are mounted on a gradation 45 of the centering mandrel 40. Further, elevations 46 in relation the gradation 45, which follow the shape of the external face 41, are attached at a distance from the teeth 44, so that a gap 47 remains between the teeth and the elevations 46. The tooth or teeth 44 and/or elevations 46 may prevent the use of an axial seal to bypass the coding. Furthermore, a passage opening 48 is provided above the external face 41, which leads to a tank passage opening when the centering element 11 is in the installed state. The filtered water of a filter cartridge 22 can be discharged from the water tank through this passage opening 48.

One or more bottom vents 49 are provided in the bottom plate 39 below external face 41. Unfiltered water can be directed out of the water tank through these openings in the bottom. Below the elevations 46 and within the wall bearing the external face 41 there is a cavity 50 for receiving the tank valve body 13.

Provided above the annular external face 41 are guide ribs 51 which can be beveled on their upper side as in the exemplary embodiment shown. The guide bevels 52 formed in this way help when inserting the guide ribs 51 into the guide grooves 32 of a filter cartridge 22. In the sectional view according to FIG. 4, the guide bevels 52 of the guide ribs 51 in the attached filter cartridge 22 can be clearly seen.

The assembled components of the water tank 1 for the connection of a filter cartridge with and without a filter cartridge 22 are shown in FIGS. 11, 11a, 11b, 12 and 12a. The fastening ring 10 is provided with a latching projection 53 with which it can latch on the tank bottom 2 by engaging behind a bottom rib 54 of the water tank. The elastomer seal 16 has a bottom section 55 which engages under the fastening ring 10 and thus holds the elastomer seal 16 with the fastening ring 10 on the tank bottom 2.

For sealing in relation to the tank bottom 2, the elastomer seal 16 has a sealing face, which in the present case is realized by a sealing bead 56. For the tight closure of the elastomer seal 16 in relation to the fastening ring 10, a circumferential sealing face can be provided at various points. In the exemplary embodiment shown, an annular seal 57 is provided which is formed on top of the elastomer seal 16 and seals with the latter in a sealing groove 58 of the fastening ring.

The elastomer seal 16 includes an outer ring 59 and an inner ring 60 which are integrally molded and connected to each other. The outer ring 59 and the inner ring 60 in terms of the shape thereof both follow circumferentially the variable radius of fastening ring 10, of the filter port 23 and of the elastomer seal 16 and the concavities and convexities formed thereby. The outer ring 59 is stepped and carries the annular seal 57 and the sealing bead 56. The outer ring 59 is also provided with one or more bypass openings 61 through which unfiltered water can enter the annular gap 62 between the outer ring 59 and the inner ring 60 in the direction of flow P1. In the installed state, the bypass opening 61 of the elastomer seal 16 is located directly after a bypass opening 63 in the fastening ring 11, which can also be seen in FIGS. 1 and 3, for example.

Through the bypass opening 63, unfiltered water can flow out of the annular gap 62 from the water tank 1 in the direction P2 into the corresponding beverage machine.

Figure 11:
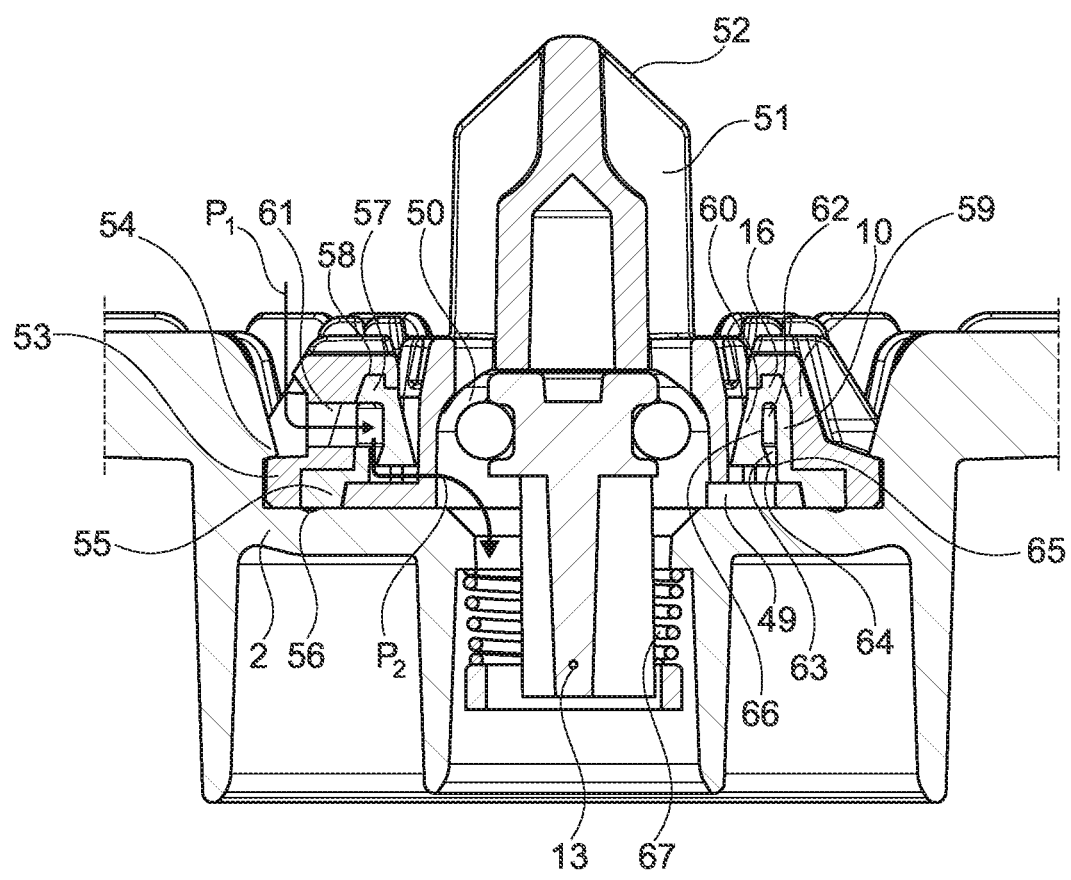
FIG. 11 shows a sectional illustration of a tank bottom without a filter cartridge, with the water tank valve open, in one example.
Figure 11A:
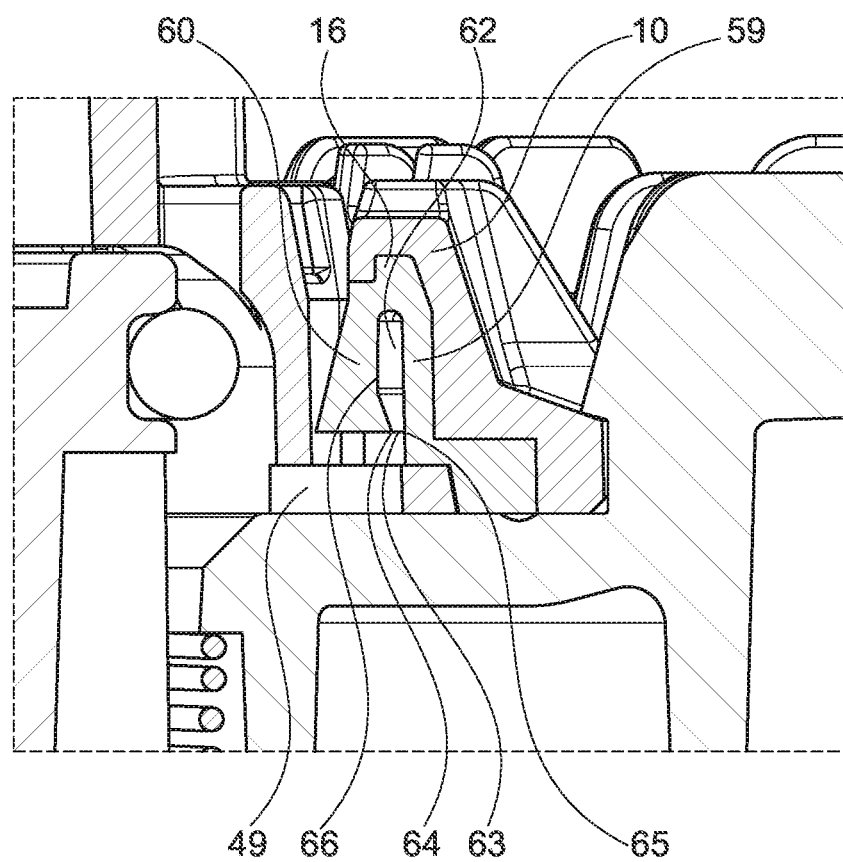
FIGS. 11a and b show two enlarged fragments from FIG. 11 to visualize a closable bypass line in the tank seal, in one example.
Figure 11B:
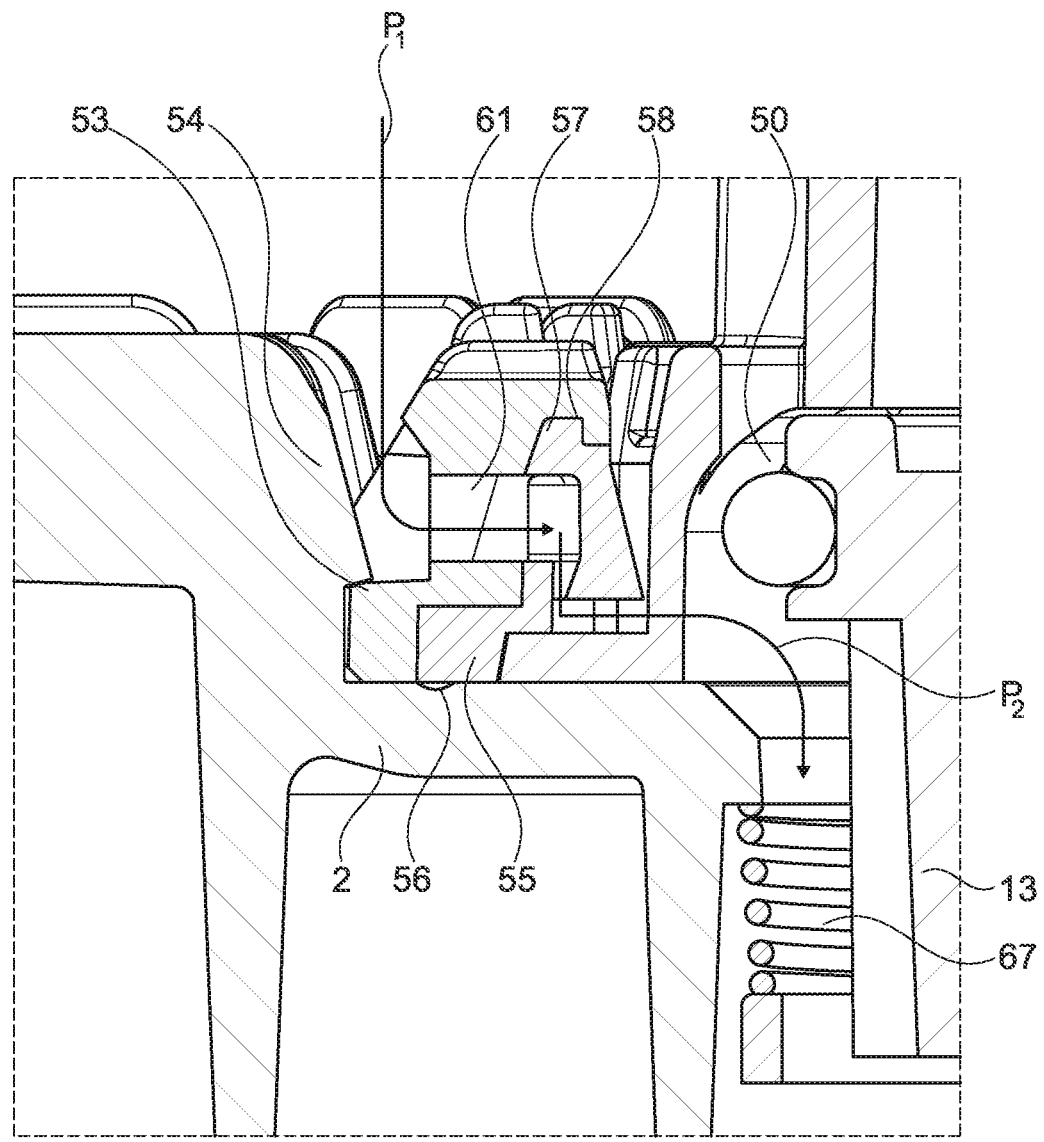

The inner ring 60 has a sealing lip 64 on its lower side, which is opposite a sealing face 65 on the outer ring 59. In the relaxed state of the elastomer seal 16, the annular gap 62 between the outer ring 59 and the inner ring 60 is open at the bottom, as can be seen in FIG. 11, so that the unfiltered water guided in the bypass can flow out of the annular gap 62 in flow direction P2. In this state, the internal side 66 of the inner ring 60, which forms the water tank seal 17, in the downward profile is beveled inward. The design embodiment of the bypass is highlighted in the enlargements according to FIGS. 11a and b.

When a filter cartridge 22 with the filter port 23 is inserted, the elastomer seal 16 is deformed so that the internal side 66 is pressed outward and runs essentially perpendicularly along the filter port. The sealing lip 64 is pressed onto the opposite sealing face 65, and thus the annular gap 62 and thus also the bypass through the bypass openings 61, 63 are closed. The deformation generates a contact pressure that presses the tank sealing face 17 against the filter sealing face 28 and at the same time the sealing lip 64 against the sealing face 65. This state is shown in FIG. 12 and FIG. 12a.

Figure 12:
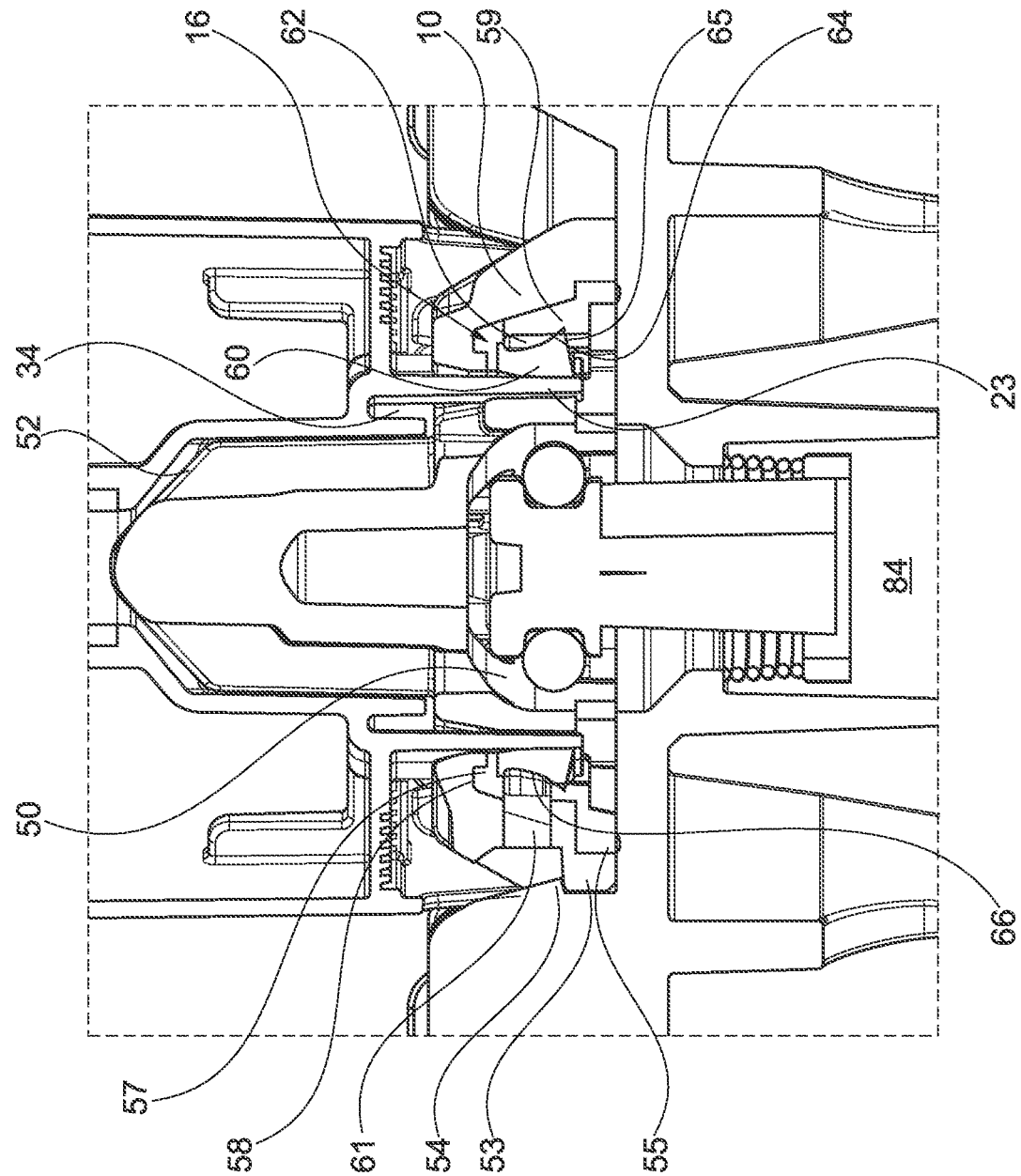
FIG. 12 shows a sectional illustration of a tank bottom according to FIG. 11 with an inserted filter cartridge, in one example.
Figure 12A:
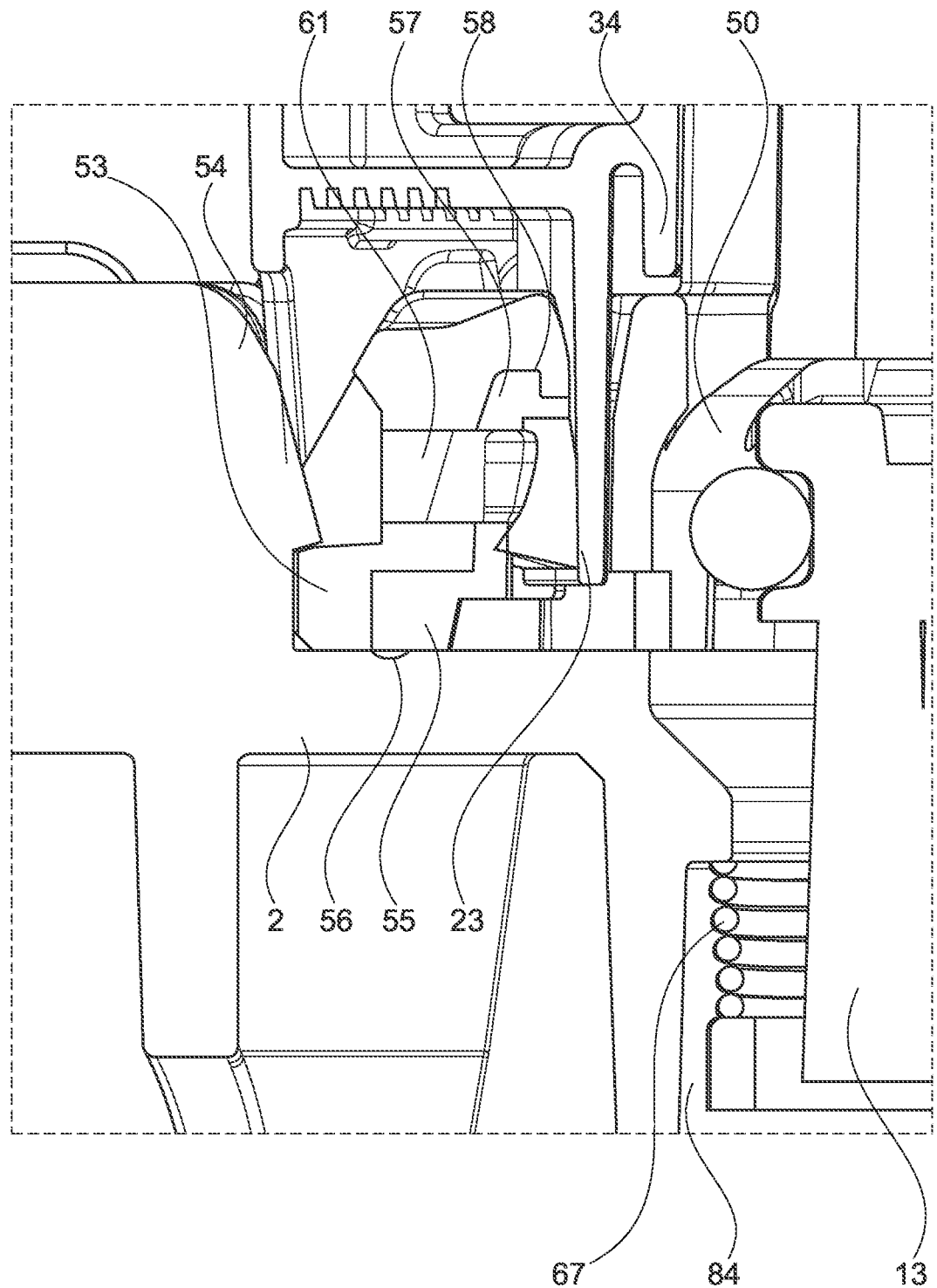
FIG. 12a shows an enlarged detail from FIG. 12 to visualize the closed bypass line.

The tank valve body 13 in FIG. 11 and in FIG. 12, by a detent (not shown in more detail) of the associated machine is raised counter to a restoring spring 67 into the cavity 50 and is thus in the open position which corresponds to the inserted water tank. If the water tank is removed from the machine, the tank valve body 13 closes under the pressure of the restoring spring 67.

The tank sealing face 18 is formed by the internal side 66 of the elastomer seal 16 and at the same time represents a first tank fixing face 18. As mentioned above, a first filter fixing face 28 formed by the filter sealing face 28 rests on this side when the filter cartridge 5, 22 is in the inserted state, under a contact pressure that deforms the elastomer seal 16 in such a way that a fixing and sealing form-fit is achieved.

A second filter fixing face 68 (see FIG. 5), which is formed by the internal face of the filter port 23, is in contact with the external face 41 forming the second tank fixing face. This form-fit is also formed under a contact pressure. Due to the shape of the filter port 23 according to one example, this forms an annular wall 69 which can be widened in a resilient manner if necessary. This results in the possibility of tolerance compensation with good fixing, which is caused by the corresponding bracing. Due to the mutually parallel or mutually inclined shaping of the first filter fixing face 28 and a second filter fixing face 68, the annular, corrugated wall 69 of the connector 23 lying between them forms a corrugated annular spring 70. The second filter fixing face 68 can also act as a second filter sealing face.

Figure 13:
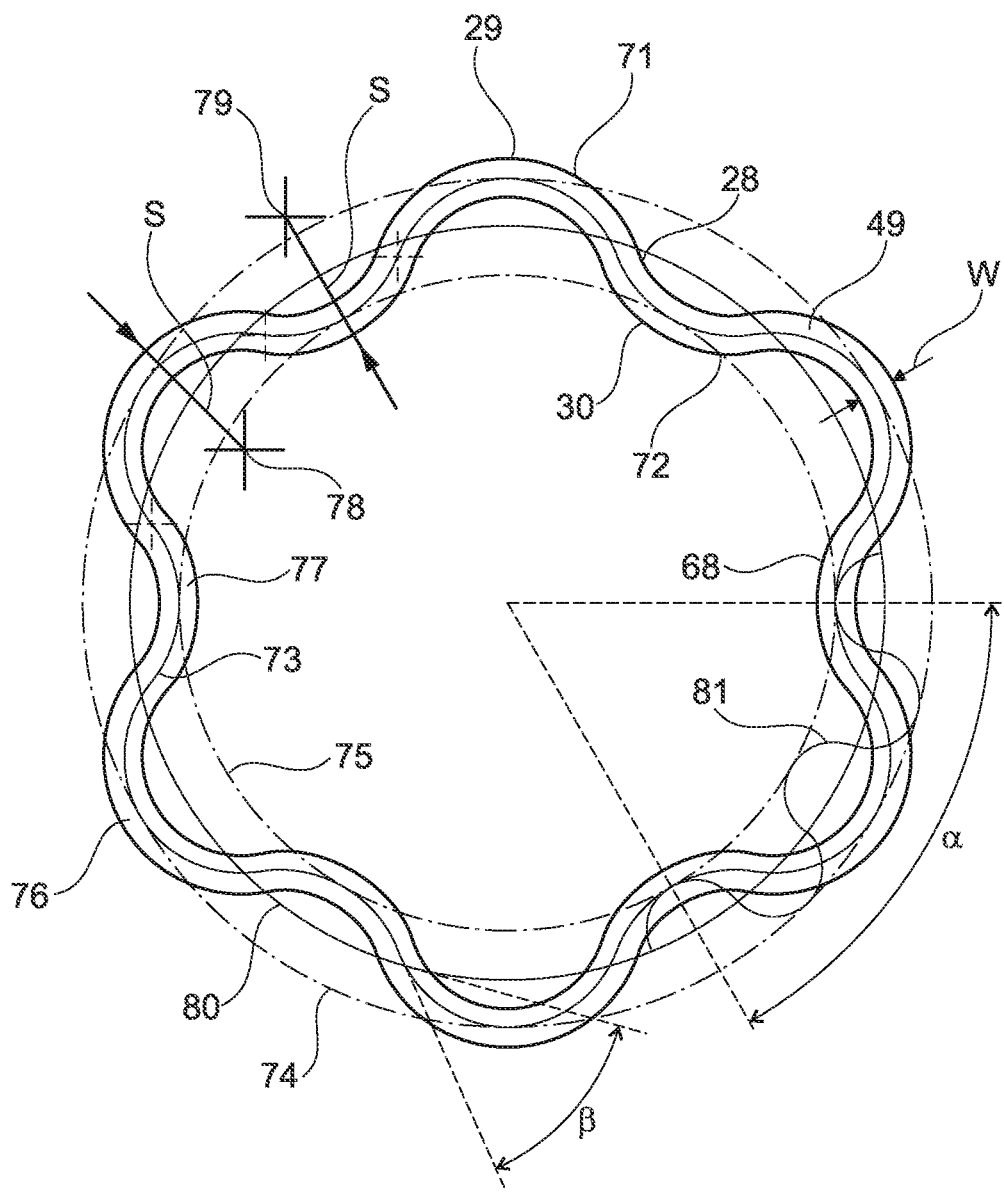
FIG. 13 shows a schematic end view of a filter port according to one example.
Figure 13A:
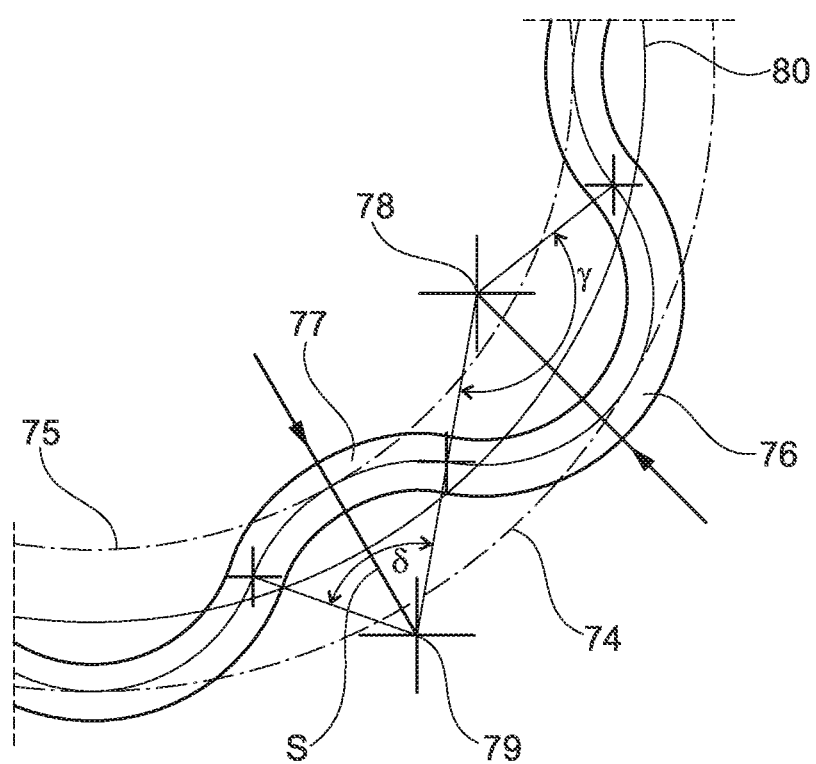
FIG. 13a shows an enlargement of a fragment from FIG. 13.

The filter port according to the end view in FIG. 13 and the enlarged detail according to FIG. 13a shows the wave shape described with convexities 29 and concavities 30. The annular wall 69 of the filter port 23 with a wall thickness W has the first filter fixing face 28 on the wall external side 71 and the second filter fixing face 68 on the wall internal side 72. The wall external side 71 and the wall internal side 72 run parallel in the view shown, but are beveled toward one another in the axial direction, which will be explained further below. The wave shape is therefore further illustrated by means of a center line 73 shown in broken lines.

The center line 73 undulates between an outer envelope circle 74, whose radius has the largest value of the variable radius, and an inner envelope circle 75, whose radius has the smallest radius of the variable radius of the wave shape. The convexities 29 and concavities 30 of the center line 73 form wave crests in the form of convex circle segments 76 and wave troughs in the form of concave circle segments 77. In the illustrated embodiment, all circle segments 76, 77 have the same segment radius S. The centers 78, 79 of the circle segments 76, 77 lie within the inner envelope circle 75 for the convex circle segments 76 and outside of the outer envelope circle 74 for the concave circle segments 77. The convex circle segments 76 and the concave circle segments 77 merge tangentially and are evenly distributed over the circumference, resulting in a rotationally symmetrical shape. In the exemplary embodiment shown, in each case six convex circle segments 76 and six concave circle segments 77 are provided, which alternately lie at an angular distance of 30°, i.e. the convex circle segments 76 lie at an angle a of 60° apart from one another and the same applies to the concave circle segments 77.

Due to the selection of the segment radius and the associated position of the associated centers 78, 79, the center line runs in a comparatively flat, curved, wavy manner around the center circle line 80. The center line 73 intersects the center circle line 80 at an obtuse angle β. As a result, the arc length of the convexities 29 is significantly longer than the arc length of the concavities 30, as a result of which the angle γ swept by the segment arc of the convexities 29 is significantly larger than the angle δ swept by the concavities 30. This shape improves the spring effect of the filter port 23.

For comparison, the drawing also shows circle segments 81 whose segment centers 82 lie directly on the center line 73. This profile, which is not realized in this embodiment, has significantly smaller segment radii and a profile that is essentially perpendicular to the center line 73.

A good spring effect has been shown with radii and wall thicknesses in which the radius of the inner envelope circle 75 is between 5% and 15% of the radius of the outer envelope circle 74 and the radius of the convex and/or concave circle segments is between 20% and 35% of the radius of the outer envelope circle 74. The wall thickness W between the wall external side 71 and the wall internal side 72 running parallel or inclined thereto (relative to the operating position) is preferably between 5% and 15% of the radius of the outer envelope circle 74.

In the example shown, the outer envelope circle 74 has a radius of approximately 11 mm and the inner envelope circle 75 has a radius of approximately 9.75 mm The segment radius of the convex and concave circle segments is approx. 3.08 mm and the wall thickness between the the wall external side 71 and the wall internal side 72 running parallel or inclined thereto is approx. 0.9 mm.

Figure 14:
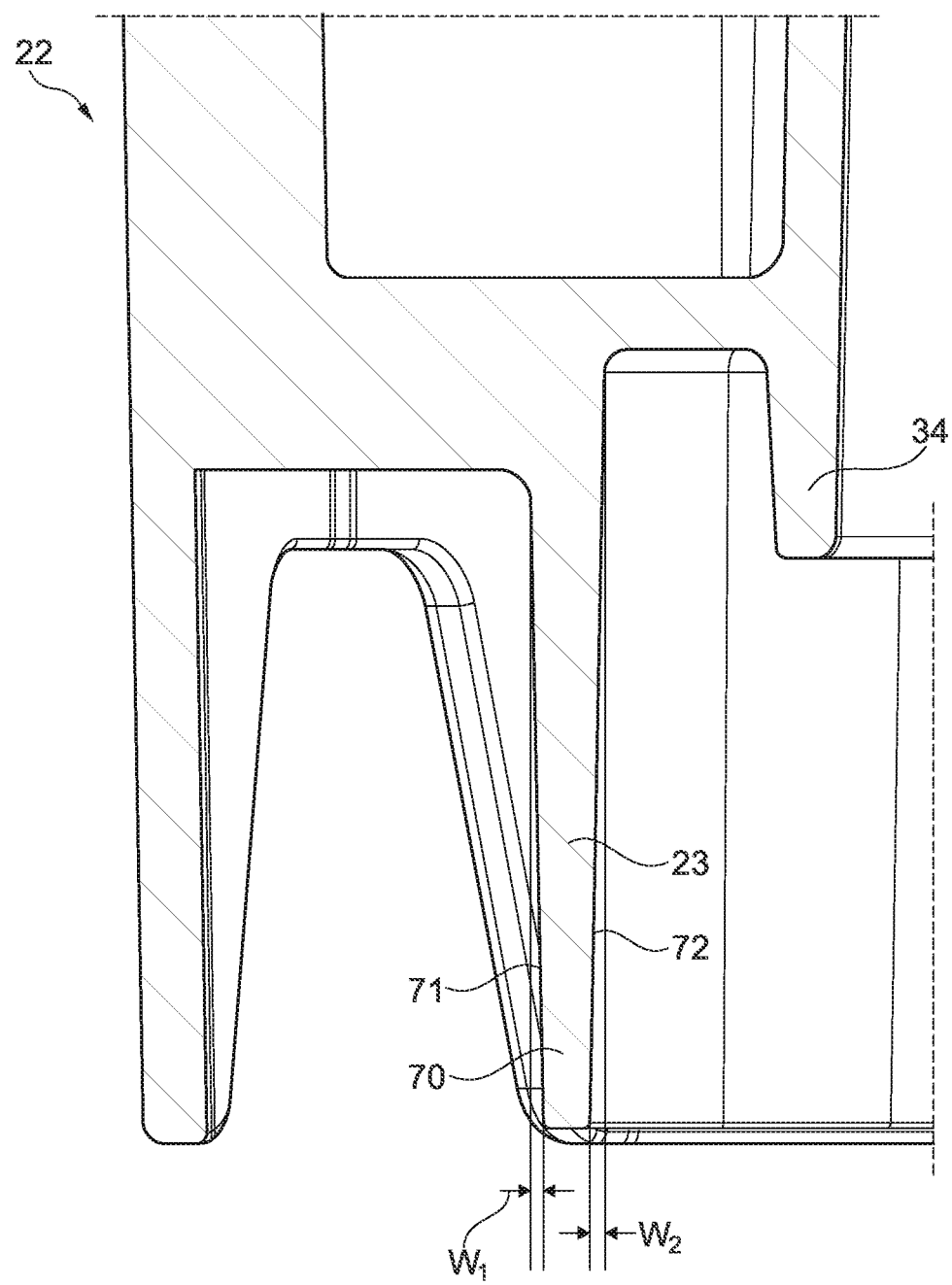
FIG. 14 shows a fragment of the filter cartridge showing the connection region to illustrate a guiding aid by bevels on the connector.

In FIG. 14 it can be seen that the external 71—and/or the internal wall 72 of the filter port 23, which depending on the embodiment also form one or two filter sealing faces 28, are beveled by the angle ω1 or ω2 in relation to the vertical, so that they based on the operating position of the filter cartridge 4, 22 converge from top to bottom. This bevel or bevels by the angle or angles to ω1 and/or ω2 form an insertion aid when inserting the connector 23 into the annular gap between the elastomer seal 16 and the external face 41 of the water tank 1.

Although the present invention has been described with reference to preferred embodiments, workers skilled in the art will recognize that changes may be made in form and detail without departing from the spirit and scope of the invention.

LIST OF REFERENCE SIGNS

1 Water tank
2 Tank bottom

3 Water tank side wall
4 Filter cartridge
5 Filter housing
6 Tank connection element
7 Filter connection
8 Interior
9 Filter port
10 Fastening ring
11 Centering element
12 Depression
13 Tank valve body
14 Seal
15 Pin
16 Elastomer seal
17 Water tank seal/annular seal
18 Tank sealing face
19 Concavity
20 Convexity
21 Connection region
22 Filter cartridge
23 Filter port/inner ring
24 Outer ring
25 Projection
26 Recess
27 Inlet screen
28 Filter sealing face/external face
29 Convexity
30 Concavity
31 Guide structure
32 Guide groove
33 Edge
34 Polygonal ring
35 Internal curvature
36 Wall
37 Filter housing
38 Metering opening
39 Bottom plate
40 Centering mandrel
41 External face
42 Concavity
43 Convexity
44 Tooth
45 Gradation
46 Elevation
47 Gap
48 Passage opening
49 Bottom vent
50 Cavity
51 Guide rib
52 Guide ramp
53 Latching projection
54 Bottom rib
55 Bottom portion
56 Sealing bead
57 Annular seal
58 Sealing groove
59 Inner ring
60 Outer ring
61 Bypass opening
62 Annular gap
63 Bypass opening
64 Sealing lip
65 Sealing face
66 Internal side
67 Restoring spring
68 Second filter fixing face/internal face
69 Wall
70 annular spring
71 Wall external side
72 Wall internal side
73 Center line
74 Outer envelope circle
75 Inner envelope circle
76 Convex circle segment
77 Concave circle segment
78 Center
79 Center
80 Center circle line
81 Circle segment
82 Segment center
83 Turning point
84 Tank passage opening
A Axis
W Wall thickness
S Segment radius
P1 Flow direction
P2 Flow direction

The invention claimed is:

1. A water tank for a household appliance having a connection for a filter cartridge, the water tank comprising:
a tank bottom; and
a tank sealing face on the tank bottom and configured to connect the filter cartridge to the water tank, wherein the tank sealing face encloses a tank passage opening for water from the filter cartridge to flow through a wall of the tank bottom to the household appliance, the tank sealing face includes, along a circumference of the tank sealing face, a variable radius in relation to a central axis of the tank sealing face, so that the tank sealing face comprises radial concavities and radial convexities, wherein the radial convexities and the radial concavities of the tank sealing face have a round profile, and wherein the radial concavities and the radial convexities of the tank sealing face are configured to periodically oscillate around a circular line of the tank sealing face,
the filter cartridge has a filter housing comprising a filter housing wall that separates a housing internal side from a housing external side,
a filter inlet opening which in operation of the filter cartridge is open in relation to an external environment of the filter housing is provided,
a device for water conduction which comprises at least one filter chamber having at least one filter medium and terminates in filter outlet opening for suctioning water from the filter cartridge is provided in an interior of the filter housing downstream of the filter inlet opening relative to a flow direction during operation,
a filter connection element having an annular filter port which has a filter sealing face for tight connection of the filter cartridge to the tank sealing face in the water tank is provided, and
a profile of the filter sealing face along a circumference of the annular filter port has a variable radius in relation to a central axis of the filter outlet opening, so that the filter sealing face comprises radial convexities and radial concavities, and the radial convexities and the radial concavities of the filter sealing face have a round profile and wherein the radial convexities and the radial concavities of the filter sealing face are configured to periodically oscillate around a circular line of the filter sealing face.

2. The water tank as claimed in claim 1, wherein the annular filter port of the filter connection element, which has the filter sealing face, consists at least in a region or the filter sealing face of a plastic which is dimensionally stable at an operating temperature and is stronger than an elastomer.

3. The water tank as claimed in claim 1, wherein the filter sealing face forms an external face of the annular filter port of the filter connection element that points away from the central axis.

4. The water tank as claimed claim 1, wherein an arrangement of the radial convexities and radial concavities of the filter sealing face is configured so as to be rotationally symmetrical over the circumference of the annular filter port.

5. The water tank as claimed in claim 1, wherein an arrangement of the radial convexities and radial concavities of the filter sealing face is configured with similar angles over the circumference of the annular filter port.

6. The water tank as claimed in claim 1, wherein the radial convexities and the radial concavities of the filter sealing face have a round profile.

7. The water tank as claimed in claim 1, wherein six convexities and six concavities are provided along the circular line of the tank sealing face which has a diameter of less than 3 cm.

8. The water tank as claimed in claim 1, wherein a guide structure for guiding and receiving a tank-proximal centering element is provided within the annular filter port.

9. The water tank as claimed in claim 8, wherein the guide structure has at least one guide groove for receiving at least one guide rib of the tank-proximal centering element.

10. The water tank as claimed in claim 9, wherein the guide structure has a plurality of guide grooves distributed around the circumference of the tank sealing face.

11. The water tank as claimed in claim 10, wherein a wall of the plurality of guide grooves is radiused in such a manner that a width or the plurality of guide grooves tapers from bottom to top in relation to an operating position.

12. The water tank as claimed in claim 10, wherein a wall of the plurality of guide grooves is radiused in such a manner that a groove width tapers from the inside to the outside.

13. The water tank as claimed in claim 10, wherein a tapered shape of the plurality of guide grooves is configured as an internal curvature in a wall connecting the plurality of guide grooves.

14. The water tank as claimed in claim 1, wherein the filter outlet opening of the filter cartridge is configured as an annular screen opening.

15. The water tank as claimed in claim 1, wherein the annular filter port of the filter connection element, which has the filter sealing face, at least in a region of the filter sealing face has a wall having a wall external side which runs parallel or inclined to a wall internal side and comprises or forms the filter sealing face.

16. The water tank as claimed in claim 1, wherein the annular filter port of the filter connection element has an external wall and an internal wall which, in relation to an operating position of the filter cartridge, is beveled at an angle so that the external wall and the internal wall of the filter cartridge converge from top to bottom.

17. The water tank as claimed in claim 16, wherein at least one of the external wall or the internal wall has a filter sealing face.

18. The water tank as claimed in claim 1, wherein the tank sealing face forms an internal face of an annular tank connection element that points toward the central axis of the tank passage opening.

19. The water tank as claimed in claim 18, wherein the annular tank connection element comprises an annular elastomer seal in which the radial convexities and radial concavities of the tank sealing face are preformed.

20. The water tank as claimed in claim 19, wherein the tank sealing face is disposed on an internal side of the radial convexities and radial concavities of the annular elastomer seal.

21. The water tank as claimed in claim 1, wherein the tank sealing face has an oblique profile leading from top to bottom toward the central axis (A).

22. The water tank as claimed in claim 1, wherein the tank bottom comprises a fastening ring and an elastomer seal inserted into the fastening ring.

23. The water tank as claimed in claim 22, wherein the elastomer seal has a sealing face for tight closure of the elastomer seal in relation to the fastening ring.

24. The water tank as claimed in claim 22, wherein the elastomer seal has a sealing face for tight closure of the fastening ring in relation to the tank bottom.

25. The water tank as claimed in claim 22, wherein a bypass channel for unfiltered water from the water tank is provided in the tank bottom, said bypass channel running from a water tank interior through the fastening ring and through the elastomer seal.

26. The water tank as claimed in claim 25, wherein the bypass channel comprises an annular gap in the elastomer seal.

27. The water tank as claimed in claim 26, wherein the elastomer seal comprises a closure element by means of which the bypass channel can be closed.

28. The water tank as claimed in claim 27, wherein the closure element comprises two opposite annular sealing faces in the annular gap, by way of which the annular gap can be closed by deforming the elastomer seal.

29. The water tank as claimed in claim 22, wherein the fastening ring comprises a latching element for latching the fastening ring to the tank bottom.

30. The water tank as claimed in claim 22, wherein a centering element for insertion into the filter cartridge is provided on the tank bottom.

31. A water tank for a household appliance having a connection for a filter cartridge, the water tank comprising:
a tank bottom; and
a tank sealing face on the tank bottom and configured to connect the filter cartridge to the water tank, wherein
the tank sealing face encloses a tank passage opening for water from the filter cartridge to flow through a wall of the tank bottom to the household appliance,
the tank sealing face includes, along a circumference of the tank sealing face, a variable radius in relation to a central axis, so that the tank sealing face comprises radial concavities and radial convexities, wherein the radial convexities and the radial concavities have a round profile, and wherein the radial concavities and the radial convexities are configured to periodically oscillate around a circular line of the tank sealing face,
the tank bottom comprises a fastening ring and an elastomer seal inserted into the fastening ring,
a centering element for insertion into the filter cartridge is provided on the tank bottom, and
the centering element has a bottom plate which lies in a receptacle of the elastomer seal and peripherally engages said receptacle from behind.

32. The water tank as claimed in claim 31, wherein a centering mandrel protrudes upward from the bottom plate of the centering element and has an annular external face which has a variable radius in relation to the central axis (A), so that the annular external face comprises at least one of radial concavities or radial convexities.

33. The water tank as claimed in claim 32, wherein the at least one of radial concavities or radial convexities of the annular external face of the centering mandrel are configured to periodically oscillate around a circular line.

34. The water tank as claimed in claim 32, wherein the at least one of radial concavities or radial convexities of the annular external face of the centering mandrel have a round profile.

35. The water tank as claimed in claim 32, wherein in the annular external face of the centering mandrel there are six concavities and six convexities along a circular line with a diameter of less than 3 cm.

36. The water tank as claimed in claim 32, wherein at least one tooth projecting upward is disposed above the annular external face.

37. The water tank as claimed in claim 32, wherein at least one passage opening leading to the tank passage opening is provided in the centering element above the annular external face.

38. The water tank as claimed in claim 32, wherein at least one guide rib is provided in the centering element above a wall supporting the annular external face.

39. The water tank as claimed in claim 38, wherein the at least one guide rib is beveled toward the central axis.

40. The water tank as claimed in claim 38, wherein an insert which is assigned to the tank bottom and comprises parts provided on the water tank for connecting the filter cartridge is provided on the tank bottom.

41. A water tank for a household appliance having a connection for a filter cartridge, wherein an annular tank sealing face is provided on a tank bottom for connection of the filter cartridge and the annular tank sealing face encloses a tank passage opening for water from the filter cartridge to flow through a wall of the tank bottom to the household appliance, wherein the annular tank sealing face includes, along a circumference of the annular tank sealing face, a variable radius in relation to a central axis, so that the annular tank sealing face comprises at least one of a radial concavity or a radial convexity and has a round profile, and wherein the at least one of a radial concavity or a radial convexity is configured to periodically oscillate around a circular line, and wherein a guide structure configured to guide and receive a tank-proximal centering element is provided within a filter port.

42. A water tank for a household appliance having a connection for a filter cartridge, wherein an annular tank sealing face is provided on a tank bottom for connection of the filter cartridge and the annular tank sealing face encloses a tank passage opening for water from the filter cartridge to flow through a wall of the tank bottom to the household appliance, wherein the annular tank sealing face includes, along a circumference of the annular tank sealing face, a variable radius in relation to a central axis, so that the annular tank sealing face comprises at least one of a radial concavity or a radial convexity and has a round profile, and wherein the at least one of a radial concavity or a radial convexity is configured to periodically oscillate around a circular line, and wherein a bypass channel for unfiltered water from the water tank is provided in the tank bottom, said bypass channel running from a water tank interior through a fastening ring and through an elastomer seal.

* * * * *